Dec. 16, 1969  D. J. DICKERSON  3,484,317
METHOD OF MAKING A TUBULAR HIGH PRESSURE RESISTANT VESSEL
Filed Sept. 22, 1967  2 Sheets-Sheet 1
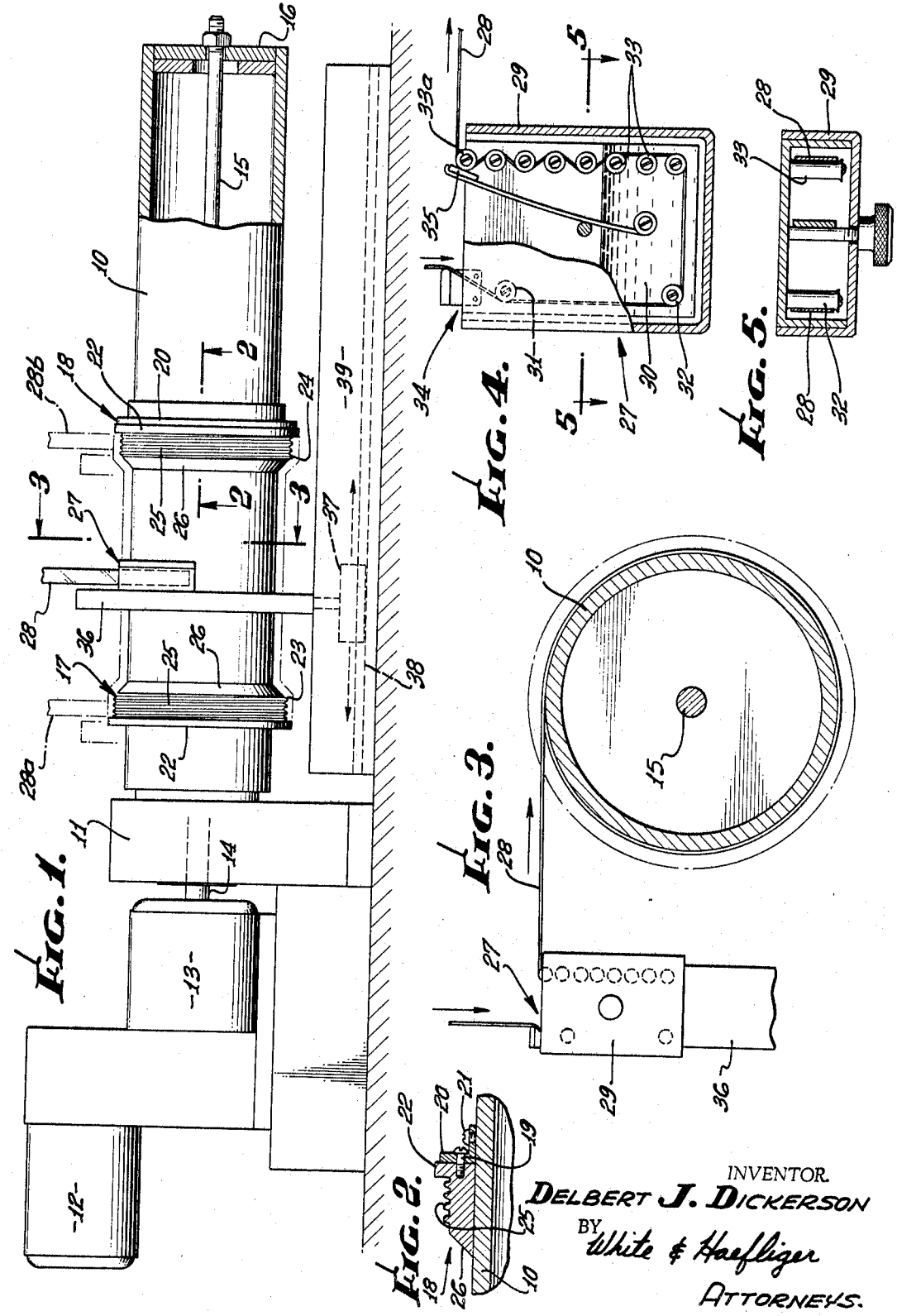
INVENTOR.
DELBERT J. DICKERSON
BY
White & Haefliger
ATTORNEYS.

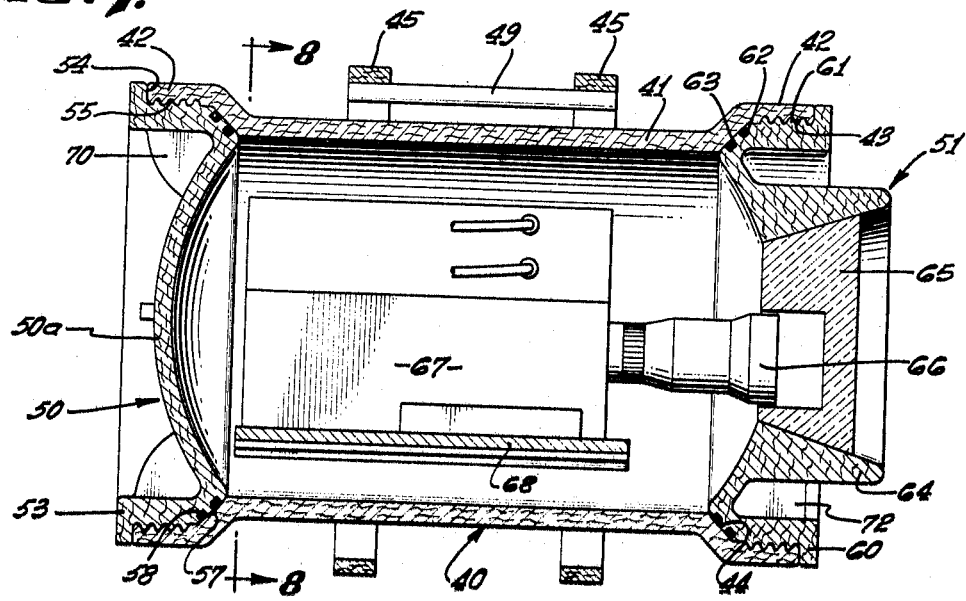

United States Patent Office 3,484,317
Patented Dec. 16, 1969

3,484,317
METHOD OF MAKING A TUBULAR HIGH PRESSURE RESISTANT VESSEL
Delbert J. Dickerson, P.O. Box 6, Agoura, Calif., 91301
Filed Sept. 22, 1967, Ser. No. 669,854
Int. Cl. B65h 81/02
U.S. Cl. 156—175                  9 Claims

ABSTRACT OF THE DISCLOSURE

This invention is directed to the making of non-metallic vessels resistant to corrosion and high external fluid pressures, and has specific application to housings for underwater photographic equipment.

A major feature of the invention is the formation of a tubular shell component of the vessel internally threaded within its end or ends, by wrapped resin coated glass strands applied and built to high pressure resistant shell thickness and forming in the same wrapping operation the threads integrally with the shell. Formed also and integrally beyond the threads are seats to be engaged by end closures screwed into the shell in an inter-thread relationship such that hydrostatic pressure can seal the closures to their seats. Other features include shaping the shell to have longitudinal concavity, providing at least one windowed closure and a camera support within the shell, and electrical conductor means in association with the shell for current delivery to the camera.

STATEMENT AND DESCRIPTION OF THE INVENTION

The general object of the present invention is to produce a non-metallic vessel characterized by its resistance to corrosion and to high external fluid pressure, and which is uniquely suitable for use as a waterproof housing for a camera or related equipment employed in underwater photography. Accordingly, the invention will be described as applied to that particular adaptation.

The invention contemplates departures from past practices employing metallic underwater camera housings, by constructing at least a tubular shell component of the housing of resin coated glass, and preferably also removable end closures for the shell, all in a manner productive of an electrically non-conductive vessel in which hardenable resin-coated glass materials are integrated to achieve high strength resistance to external hydrostatic pressures, complete protection of contained photographic equipment, and various additional advantages resulting from the composition and form of the vessel.

Particularly contemplated is a vessel structure having a tubular shell internally threaded within its ends to receive threaded closures, and formed of wrapped resin coated stranded glass in a manner such that the glass strands form the shell threads in integrated relation with the shell structure. In this manner the thread formation becomes a continuously unitized part of the shell build-up, with resultant integrity of the threads and a procedure permissive of forming the threads to configurations related as hereinafter explained, to the closure threads. In the same forming operation the resin-coated strand is wrapped to form seats against which the closures have water-tight sealed engagement.

In the same shell forming operation it is found particularly advantageous to provide one or more handles for underwater manipulation and control of the apparatus, and to form the handles as resin-glass wrapping applied about the shell.

Other objects and details relating to the shell construction is its preferred form of concavity between enlarged ends, the provision of an internal support for mounting the camera in alinement with a windowed end closure, and inclusion of means used in electrical power transmission to the camera.

In reference to the end closure and shell relation, the invention has a further objective in providing for threaded retention of the closure within the shell, together with capacity given the closure for non-rotative fluid pressure displacement against sealing means interposed between the closure and its seat.

All the various features of the invention, together with the details of an illustrative embodiment, will be understood from the following description of such embodiment as shown by the accompanying drawings, in which:

BRIEF DESCRIPTION OF THE DRAWINGS

FIG. 1 is a view, diagrammatic in parts, showing the winding mandrel and associated glass strand feed in side elevation;

FIG. 2 is an enlarged fragmentary section taken on line 2—2 of FIG. 1;

FIG. 3 is an enlarged cross section on line 3—3 of FIG. 1;

FIG. 4 is a part sectional enlargement of the strand resin coating and feed device appearing at the left in FIG. 3;

FIG. 5 is a cross section on line 5—5 of FIG. 4;

FIG. 6 is a view showing in perspective the completed vessel together with its end closures;

FIG. 7 is an enlarged longitudinal cross section on line 7—7 of FIG. 6;

FIG. 8 is a section taken on line 8—8 of FIG. 7;

FIG. 9 is a fragmentary sectional enlargement illustrative of the threaded and sealing interengagement between the tubular body of the vessel and one of its end closures; and FIG. 10 is an enlarged fragmentary section on line 10—10 of FIG. 6.

DESCRIPTION OF THE PREFERRED EMBODIMENTS

It is recognized that various types and constructions of rotary winding mandrels with associated drive and feed mechanisms are known in the art, and therefore it is unnecessary to show or describe the assembly of FIG. 1 beyond the generalities illustrated. However, with respect to certain novel departures from the conventional and with which the invention is significantly concerned, and notably the terminal shell-forming cores, those features are shown and will be described in such detail as may be required for full understanding of the methods employed and the resulting product.

Referring to FIG. 1 the tubular vessel and camera housing shell is formed on a cylindrical mandrel 10 rotatably carried at one end by a support 11, the mandrel being rotatably driven by motor 12 through appropriate gear reduction 13 and shaft 14. The hollow mandrel may contain a shaft 15 in the form of a tie bolt engaged against the closed end 16 of the mandrel.

The mandrel is shown to carry at spaced locations a pair of annularly threaded core rings generally indicated at 17 and 18, one of which e.g. 17, may be formed integrally with or otherwise having fixed position on the mandrel, the second core ring 18 being removable from the mandrel and variably positionable therealong in accordance with the length of shell to be formed. Accordingly, as particularly illustrated in FIG. 2 the core ring 18 is shown to be attached by screws 19 to a mounting ring 20 which in turn is releasably held to the mandrel by set screws 21 which, when loosened, permit removal of the ring assembly from the mandrel or adjustment in predetermined spacing from the core ring 17. Each of the core rings has a terminal annular flange 22 definitive of the wound shell ends and at the inside of which the bodies 23 and 24 of the rings are externally threaded at 25, the threads being of generally curved shape in cross section for greater assurance of full conformity of the applied resin impregnated glass strands to the thread shapes and contours. Inwardly adjacent the threads the core rings have beveled faces 26 for formation of the vessel end closure sets as will appear.

Suitable means as for example generally indicated at 27, is provided for coating with resin and feeding to the mandrel fiber glass in strand form, preferably in rather loosely stranded ribbon form 28, the ribbon width being in the order of about 3/8 inch. The strands may be fed to the mandrel in single or parallel ribbons, although for simplicity in illustration a single ribbon feed is shown.

For the purpose of both coating and feeding the ribbon the structure at 27 is shown to comprise an open top container 29 for a liquid body of suitable resin 30 which typically may be a polyester together with such catalyst or other agent as will permit the resin as embedded in the wound shell to harden under atmospheric conditions within a matter of a few hours. Such resins or resinous compositions as such, are well known. The vessel 29 contains an arrangement of guide rollers 31, 32 and 33 about which the ribbon 28 fed into the vessel at 34 is directed through the resin bath 30 so that the ribbon becomes thoroughly coated with the resin, excess of which is removed in passing between roller 33a and the spring urged squeegee 35. The container 29 may be carried by a suitable support 36 having a base 37 reciprocable longitudinally of the mandrel within a guide channel or way 38 in a mounting base 39. Any suitable mechanical means unnecessary to show, may be employed to reciprocate the support 36 and container 29 between the extreme ribbon winding positions indicated at 28a and 28b.

In the operation of forming the tubular pressure vessel and camera housing shell 40 as it appears in FIG. 7, the resin coated ribbon is progressively spirally and firmly wound about the mandrel. Starting for example at the 28a position the ribbon is wound into and in exact conformity with the threads of core ring 23 and the ribbon is progressively fed and wrapped against and in conformity with the seat forming shoulder 26. Continued advancement of the feed causes the ribbon to traverse the cylindrical extent of the mandrel and then the seat forming shoulder and threads 25 of ring 24. By repeated reciprocations of the ribbon feed, the ribbon is firmly or tightly wrapped in overlap and between the extreme positions 28a and 28b until by many ribbon plies the shell 40 is built to desired pressure resistant thickness. Upon completion of the winding operation, the resin is allowed to cure while on the mandrel. Thereafter, core ring 24 is unscrewed from within the formed shell and removed from the free end of the mandrel, after which the shell is unscrewed from the fixed ring 23 and similarly removed to be allowed to cure at room temperature.

The resulting shell 40 as seen in FIG. 7 has beyond a reduced diameter extent 41 enlarged ends 42 internally threaded at 43 beyond angular and inwardly tapering seats 44. For use as an underwater camera housing the shell may be provided with either or both handle means and base support formed in the same wrapping operation as the body of the shell, so that as completed, the shell will have extending about it and integrally bonded thereto a pair of loops 45 spaced from the shell to form handle clearances at 46 and a base extent 47 with shell clearance at 48. In the operation of forming the loops, after the shell 41 is wound, removable spacers, not shown, corresponding in shape to the clearances at 46 and 48 are applied to the shell and the resin coated ribbon is wound repeatedly about the spacers and in engagement with the sides of the shell as viewed in FIG. 8 to form, after removal of the spacers, the loops at 45 and 47. Additional handle facilities may be provided by wrapping the ribbon about rods 49 extending between and bonded to the loops 45.

In FIG. 7 the shell 40 is shown to contain a pair of end closures 50 and 51 the bodies of which are formed of resin coated woven or matted fiber glass in molds corresponding to the closure shapes. The same type of polyester resin curable at room temperatures may be used in the closure formation. Referring to FIG. 9 the closure 50 may have an outwardly concave pressure resistant central area 50a and an outer annular periphery 53 presenting a shoulder 54 inwardly from which the closure has threads 55 of curved cross sectional configuration similar to the shell threads 43 but with clearances therefrom at 56. Inwardly beyond the threads the closure has tapered seating face 57 corresponding in angularity to the shell seat 44, the closure carrying one or a plurality of elastomeric O-rings 58 engageable against the seat 44. The closure 50 is insertable by screwing into the shell, but water-tight sealed engagement of the closure against the seat 44 is maintained independently of final closure rotation in screwing into the shell. Such independence results from the interthread clearance at 56 in that upon contact of the O-rings 58 against the seat the closure is bodily and axially displaceable by hydrostatic pressure as afforded by the thread clearance, to press and deform the O-rings into continuous sealed engagement with the shell seat.

The opposite end closure 51 is similarly flanged at 60, threaded at 61 and provided with O-rings 62 engageable against the seat 63 in the relationship described with reference to the opposite end closure. The centrally bossed tubular portion 64 of the closure 51 contains a transparent window 65 for alinement with the lens head 66 of an underwater camera 67 for which supported alinement with the window is provided by a base 68 adhered to the shell 41 and having sides 69 for confinement of the camera.

To aid in rotational screwing by hand, or tool if desired, of the closure 50 into and out of the body 40, the closure may have circularly spaced integrally molded radial lugs 70. Similarly closure 51 may be provided with integrally formed turning handle lugs or webs 72 bridging the portions 61 and 64.

Inasmuch as provision is required for power supply to the motor driven camera 67, the vessel may be equipped with suitable means for passing a conductor line or cable run down from the water surface for connection with the camera. Such means may comprise typically a conductor line-passing bushing 73 threaded into the body of the vessel and containing a bore 74 for passage and sealed accommodation of the conductor.

I claim:

1. The method of making a tubular high pressure resistant vessel, that includes rotating a mandrel having about its surface a screw thread configuration near an intended end of the vessel, wrapping about the mandrel resin-coated stranded glass fiber by application to said screw thread configuration and continuing along the mandrel to the opposite intended end of the vessel, continuing the wrapping to form and build the vessel to high pressure resistant wall thickness with threads formed in its inside in correspondence with said mandrel configuration, and removing the vessel from the mandrel for cure.

2. The method of claim 1, in which the mandrel has an outward annular shoulder near and reducing in diameter from the diameter of said threaded configuration, the impregnated fiber being wound against said shoulder to form in the vessel a closure seat inwardly from the vessel threads.

3. The method of claim 1, in which the mandrel has about its surface screw thread configurations near both intended ends of the vessel and to which the fiber is applied to form internal threads within both ends of the vessel.

4. The method of claim 3, in which the mandrel has a pair of outward annular shoulders near and reducing from the diameters of said threaded configurations to form in the vessel closure seats inwardly from the vessel threads.

5. The method of claim 1, in which the mandrel and vessel threads are of generally rounded shape in cross section.

6. The method of claim 1, in which the fiber strand is in essentially ribbon form.

7. The method of claim 6, in which parallel strands are simultaneously wrapped about the mandrel by repeatedly traversing its length.

8. The method of claim 1, including the further step of wrapping about the uncured vessel while on the mandrel resin coated glass strand to form a carrying handle for the vessel.

9. The method of claim 8, in which the handle forming strand is wrapped about a location spaced from the vessel surface.

References Cited
UNITED STATES PATENTS

| | | | |
|---|---|---|---|
| 2,751,237 | 6/1956 | Conley | 156—173 XR |
| 2,928,764 | 3/1960 | Magoon | 156—173 XR |
| 3,073,475 | 1/1963 | Fingerhut | 220—3 |
| 2,629,894 | 3/1953 | Boggs | 156—173 XR |

PHILIP DIER, Primary Examiner

U.S. Cl. X.R.

95—11; 20—3, 46; 156—425, 433